(12) United States Patent
Hasegawa

(10) Patent No.: US 6,504,964 B1
(45) Date of Patent: Jan. 7, 2003

(54) OPTICAL MEMBER SWITCHING APPARATUS FOR ELECTRONICALLY SWITCHING A PLURALITY OF OPTICAL MEMBERS IN CORRESPONDENCE WITH AN OBJECT TO BE INSPECTED BY A MICROSCOPE

(75) Inventor: Kazuhiro Hasegawa, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 135 days.

(21) Appl. No.: 09/651,442

(22) Filed: Aug. 30, 2000

(30) Foreign Application Priority Data

Sep. 1, 1999 (JP) .......................... 11-247911
Aug. 24, 2000 (JP) ........................ 2000-253926

(51) Int. Cl.⁷ ................................ G02B 6/26
(52) U.S. Cl. .......................... 385/16; 385/147
(58) Field of Search ................ 385/16, 18, 31, 385/39, 147; 396/177, 296; 359/703

(56) References Cited

U.S. PATENT DOCUMENTS 4,874,233 A * 10/1989 Yamomoto et al. ......... 359/703
4,978,989 A * 12/1990 Nakano et al. ............. 396/177
5,532,809 A * 7/1996 Hamanaka et al. ........ 271/3.15
5,802,408 A * 9/1998 Suda .......................... 396/296
5,865,435 A * 2/1999 Ikeda et al. ................... 124/4

FOREIGN PATENT DOCUMENTS

JP 07-311343 * 11/1995 ................. 385/16
JP 2539903 * 7/1996 ................. 385/16

* cited by examiner

Primary Examiner—Akm E. Ullah
(74) Attorney, Agent, or Firm—Frishauf, Holtz, Goodman & Chick, P.C.

(57) ABSTRACT

An optical member switching apparatus for electromotively switching a plurality of optical members in correspondence with an object to be inspected by a microscope, has intermittent operation transmitters for intermittently making power transmission between a motor driving source and a switching member to which the optical members are attached, an alignment member for aligning each optical member on an optical path m, and a detection member for detecting if the optical member is aligned on the optical path m.

6 Claims, 15 Drawing Sheets

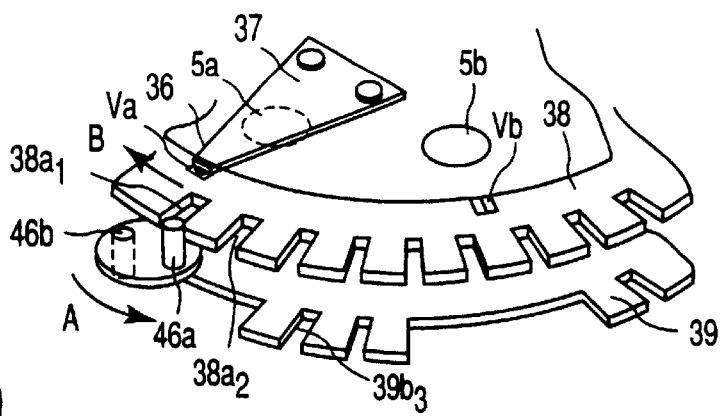
F I G. 19
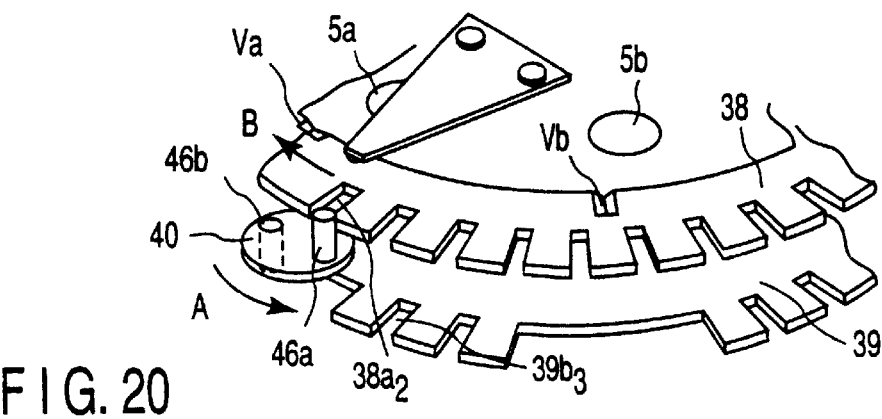
F I G. 20
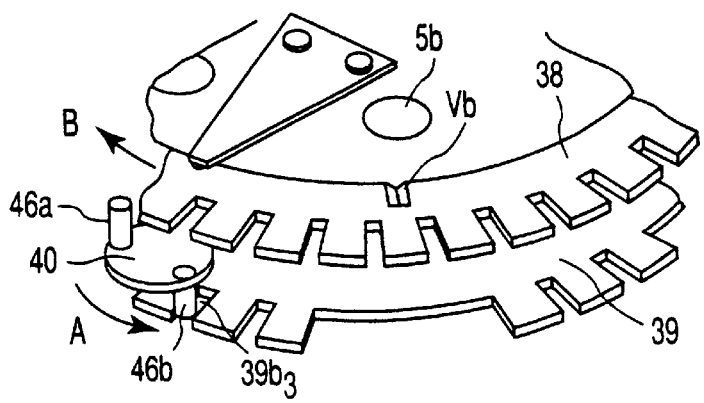
F I G. 21

OPTICAL MEMBER SWITCHING APPARATUS FOR ELECTRONICALLY SWITCHING A PLURALITY OF OPTICAL MEMBERS IN CORRESPONDENCE WITH AN OBJECT TO BE INSPECTED BY A MICROSCOPE

CROSS-REFERENCE TO RELATED APPLICATIONS

This application is based upon and claims the benefit of priority from the prior Japanese Patent Applications No. 11-247911, Sep. 1, 1999; and No. 2000-253926, Aug. 24, 2000, the entire contents of which are incorporated by reference.

BACKGROUND OF THE INVENTION

The present invention relates to an optical member switching apparatus for selecting a desired one of a plurality of optical members in correspondence with the object to be observed, and aligning the selected optical member on an observation optical path in an optical apparatus such as a microscope.

Optical member switching apparatuses include an object lens switching apparatus, i.e., a so-called revolver, which selects an objective lens with a desired magnification in correspondence with the object to be observed, and aligns the selected lens on the observation optical path, a cube switching apparatus which locates a plurality of cubes (filter blocks) at a branch point between the observation optical path and illumination optical path in correspondence with the characteristics of a fluorescence reagent in epifluorescence observation, and the like. Conventionally, in an apparatus of this type, rotation of a revolver is stopped by providing a mechanical engaging mechanism between movable and stationary portions of the revolver. The engaging mechanism mechanically engages the movable and stationary portions of the revolver every time the optical axis of each objective lens attached to the revolver reaches a position where it matches the observation optical axis of an optical apparatus such as a microscope or the like, thus aligning and holding the lens.

As a first example of such optical member switching apparatuses, a technique disclosed in Jpn. Pat. Appln. KOKAI Publication No. 5-281457 is known (prior art 1). This objective lens switching apparatus has a revolver 102 to which a plurality of objective lenses 101 are attached, a motor 103 for rotating and braking the revolver 102, and a transmission mechanism 104 for transmitting the rotation of the motor 103 to the revolver 102, as shown in FIG. 1. A mark plate 105 which has two index portions that give the deceleration and stop timings of the motor 103 is provided to the rotation shaft of the motor 103 or transmission mechanism 104, and a reflection sensor 106 and transmission sensor 107 corresponding to the two indices are provided to an apparatus stationary portion 109. A click ball 108 is fixed to the upper surface on the outer periphery of the revolver 102, and a desired objective lens 101 is aligned to an observation optical axis m when the click ball 108 engages with a distal end hole (not shown) of a leaf spring 111 fixed to a stationary member 110 in which the revolver 102 pivotally fits.

The motor 103 begins to decelerate when the desired objective lens 101 has reached a given position before the observation optical axis m. After the motor 103 has sufficiently been decelerated, it is stopped when the lens 101 has reached a position near the position of the observation optical axis m. At this time, the reflection sensor 106 detects a reflection pattern of the mark plate 105 before the click ball 108 falls within the engaging range of the distal end hole (not shown) of the leaf spring 111 biased by an elastic force, and an electronic control circuit sufficiently decelerates the rotation of the motor 103 in response to this detection signal. When the click ball 108 falls within the engaging range of the leaf spring 111, the transmission sensor 107 detects a notched portion of the mark plate 105, and the electronic control circuit completely stops the motor 103 in response to this detection signal. As a result, the click ball 108 fits in the engaging range of the distal end hole of the leaf spring 111, and the desired objective lens 101 is aligned to the observation optical axis m. In this way, the objective lens can be accurately and quickly aligned to the optical axis of the optical apparatus.

As a second example of the optical member switching apparatus, a technique disclosed in Jpn. Pat. Appln. KOKAI Publication No. 7-311343 is known (prior art 2). This objective lens switching apparatus has a revolver 112 for holding an objective lens (not shown), a motor 113 for rotating and braking the revolver 112, an alignment portion 114 for mechanically stopping the revolver 112 decelerated by braking the motor 113 at a predetermined position, and a constant amount rotation detector 116 for detecting a predetermined amount of rotation of the revolver 112, as shown in FIGS. 2 and 3. The revolver control circuit 115 begins to brake the motor 113 a pre-set delay time after it receives the detection result from the constant amount rotation detector 116.

The braking timing of the motor 113 for aligning a desired objective lens to the observation optical axis is adjusted by an electrical means. As the detection means 116 that detects a predetermined amount of rotation after the revolver 112 begins to rotate, for example, a photointerrupter 117 and light-shielding plate 118 are provided, and the photointerrupter 117 detects a notch 118a of the light-shielding plate 118, thus generating a detection output. The revolver control circuit 115 generates a delay output the pre-set delay time after it receives the detection output, and brakes the motor 113 at that timing. Since adjustment for accurately aligning a desired objective lens can be done by electrical delay time adjustment, the adjustment process can be facilitated.

Furthermore, as a third example of the optical member switching apparatus, a technique disclosed in Japanese Patent No. 2,539,903 (Leica) is known (prior art 3). This objective lens switching apparatus has a motor driving device 122 for rotating a revolver, a code device 123 for detecting the rotation position of the revolver, a selection means 124 for pre-selecting a revolver hole as a target position, a control circuit 125 for controlling rotation of the motor driving device 122, and an engaging means (not shown) for fixing the selected revolver hole at the target position, as shown in FIG. 4. Deceleration marks 128 which are used to begin to brake the revolver and correspond in number to that of objective lenses are formed on a code disk 127 of the code device 123, and the rotational speed of the motor driving device 122 is decreased by collaboration of the deceleration marks 128 and a sensor 129 before the revolver reaches the target position, thus accurately and quickly aligning a desired objective lens to the target position.

These prior arts suffer the following problems. That is, in any prior art mentioned above, since the way objective lenses are attached (the number, types, and attachment positions of lenses) varies depending on apparatus users, and the load on the motor that rotates the revolver changes, it is difficult to attain optimal stop control of the motor.

In prior art 1, as shown in FIG. 1, the positional relationship between the reflection sensor 106 and the reflection pattern of the mark plate 105, and that between the transmission sensor 107 and the notch of the mark plate 105 are accurately adjusted in assembly, and are optimized to allow successful engagement between the click ball 108 and the leaf spring 111. However, in this prior art, since the mark plate 105 having two indices that give the deceleration and stop timings of the motor 103 are provided not to the revolver 1102 but to the rotation shaft of the motor 103 or transmission mechanism 104, if clattering (backlash) of the transmission mechanism 104 is large or varies in units of objective lens switching apparatuses, it is hard to adjust the positional relationships between the sensors 106 and 107 and the mark plate 105.

Also, since both the reflection sensor 106 and transmission sensor 107 must be accurately adjusted, a long adjustment time is required. Furthermore, the load inertia on the motor 103 largely varies depending on the manner objective lenses are attached (the types, number, attached positions, and the like of lenses). However, the positional relationship adjustment is always fixed irrespective of the manner the objective lenses 101 are attached, and it is very difficult to adjust the positional relationships between the mark plate 105 and the sensors 106 and 107 to assure engagement between the click ball 108 and leaf spring 111 without any overrun or shortrun of the revolver 102 in every cases.

In prior art 2, as shown in FIG. 2, the delay time is optimally adjusted in units of revolver devices to prevent a click ball 119 from overshooting or undershooting a V-groove 120. However, since this delay time is a fixed value for each revolver device, and cannot cope with a change in the manner objective lenses are attached (the types, number, and attached positions of lenses), the click ball 119 often fails to engage with the V-groove 120 depending on the manner these objective lenses are attached. Also, such shortcomings readily occur when the load on the motor 113 (see FIG. 3) or the motor characteristics themselves change due to aging of a revolver device.

In prior art 3, as shown in FIG. 4, the deceleration marks 128, which are used to start braking of the revolver 121 and correspond to the number of objective lenses, are formed on the code disk 127 to have optimal sizes so as to accurately and quickly align a desired objective lens to the target position. However, this prior art cannot satisfactorily cope with changes in ways objective lenses are attached or aging, either.

As a problem common to prior arts 1 to 3, since the rotation position is electrically detected and the motor is braked to align the lens, difficult adjustment and complicated control means are required, and changes in the manner optical members are attached cannot be coped with.

BRIEF SUMMARY OF THE INVENTION

The present invention has been made in consideration of the conventional problems, and has as its object to provide an optical member switching apparatus which can easily adjust the positional relationship by a simple means, can cope with changes in the manner optical members are attached, and can reliably switch optical members.

In order to achieve the above object, according to the first invention, an optical member switching apparatus for electomotively switching a plurality of optical members, is characterized by comprising intermittent operation transmission means for intermittently making power transmission between a motor driving source and a switching member to which the optical members are attached, alignment means for aligning at least one of the plurality of optical members on an optical path during a pause period of power transmission by the intermittent operation transmission means, and detection means for detecting if at least one of the plurality of optical members is aligned on the optical path by the alignment means.

In such optical member switching apparatus, the driving power of the motor driving source is converted into the intermittent detection operation of the switching member to which the optical members are attached, the alignment means accurately aligns a given optical member on the optical path, and the detection means confirms the alignment result of the optical member.

According to the second invention of the present invention, the apparatus of the first invention is characterized that the intermittent operation transmission means has a motor gear provided to the motor driving source, a spur gear which meshes with the motor gear, a driving wheel which is formed integrally with the spur gear, and has a transmission pause portion for pausing power transmission from the motor driving source, and a power transmission portion for transmitting power from the motor driving source, a small gear which meshes with a large gear of the switching member, and a driven wheel which is formed integrally with the small gear, and has a slave transmission pause portion for pausing power transmission from the driving wheel, and a power transmission portion for transmitting power from the driving wheel, and a rotation amount of the slave transmission pause portion defined by a gap between the slave transmission pause portion and the transmission pause portion is smaller than a pull-in amount of the alignment means in a rotation direction thereof.

According to such optical member switching apparatus, since the rotation amount of the slave transmission pause portion defined by the gap between the slave transmission pause portion and he transmission pause portion is set to be smaller than the pull-in amount (click groove width) of the alignment means in its rotation direction, the optical member can be reliably aligned onto the optical path during the power transmission pause period of the intermittent operation transmission means.

Furthermore, according to the third invention of the present invention, the apparatus of the second invention is characterized that the slave transmission pause portion is a pigeon tail shaped stationary portion formed on an outer periphery of the driven wheel, the slave power transmission portion is a toothed groove having epicycloidally approximated gear teeth, which is formed on the outer periphery of the driven wheel and on a portion other than the pigeon tail shaped stationary portion, the transmission pause portion is a stationary portion which engages with the stationary portion of the driven wheel, and the power transmission portion is an engaging pin which engages with the toothed groove of the driven wheel and the number of which is equal to the number of toothed groove.

According to the present invention, since the power transmission period uses a toothed groove having epicycloidally approximated gear teeth, smooth power transmission is assured. In a transmission pause period falling outside the power transmission period, nearly no load is imposed on the motor driving source, and a variation of the motor driving source due to the load is smaller than that in the conventional sensor detection scheme. Also, since one pause period is formed per revolution, the present invention can be applied to apparatuses having different numbers of holes by changing only the gear ratio between the switching member and driven wheel.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 19 is a perspective view showing the first state of the objective lens switching operation of embodiment 2;

FIG. 20 is a perspective view showing the second state of the objective lens switching operation of embodiment 2;

FIG. 21 is a perspective view showing the third state of the objective lens switching operation of embodiment 2;

DETAILED DESCRIPTION OF THE INVENTION

Figure 1:
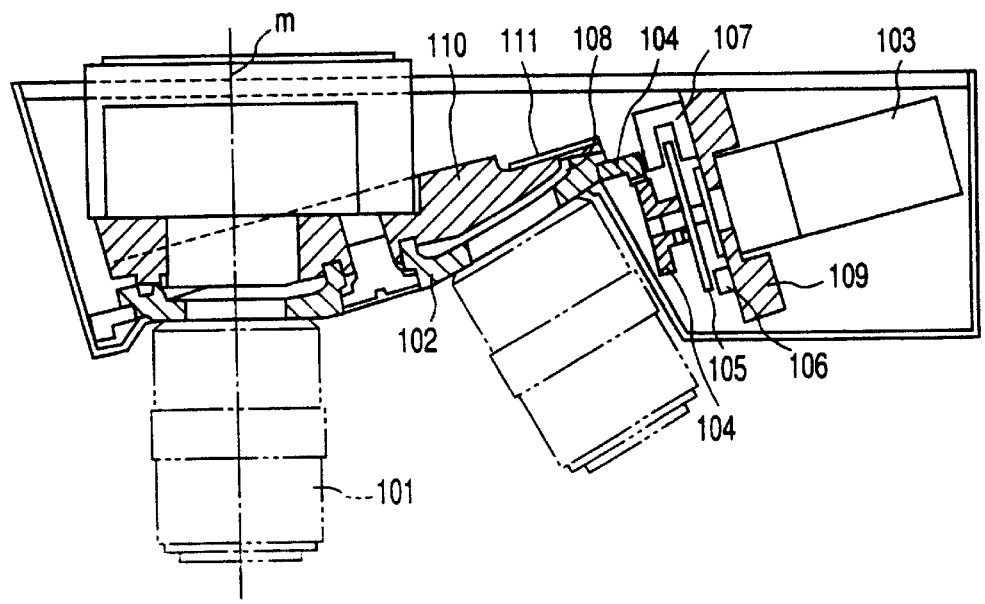
FIG. 1 is a longitudinal sectional view of an optical member switching apparatus of prior art 1.
Figure 2:
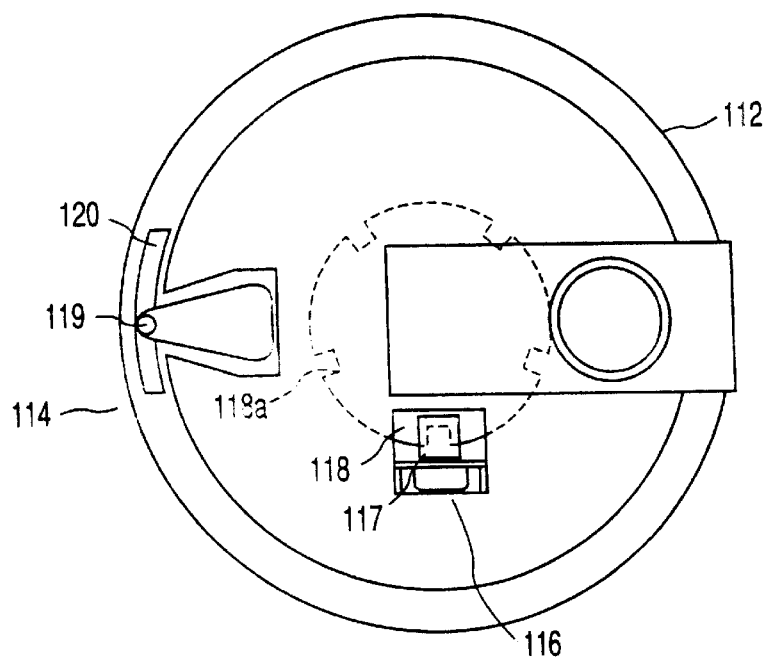
FIG. 2 is a plan view of an optical member an switching apparatus of prior art 2.
Figure 3:
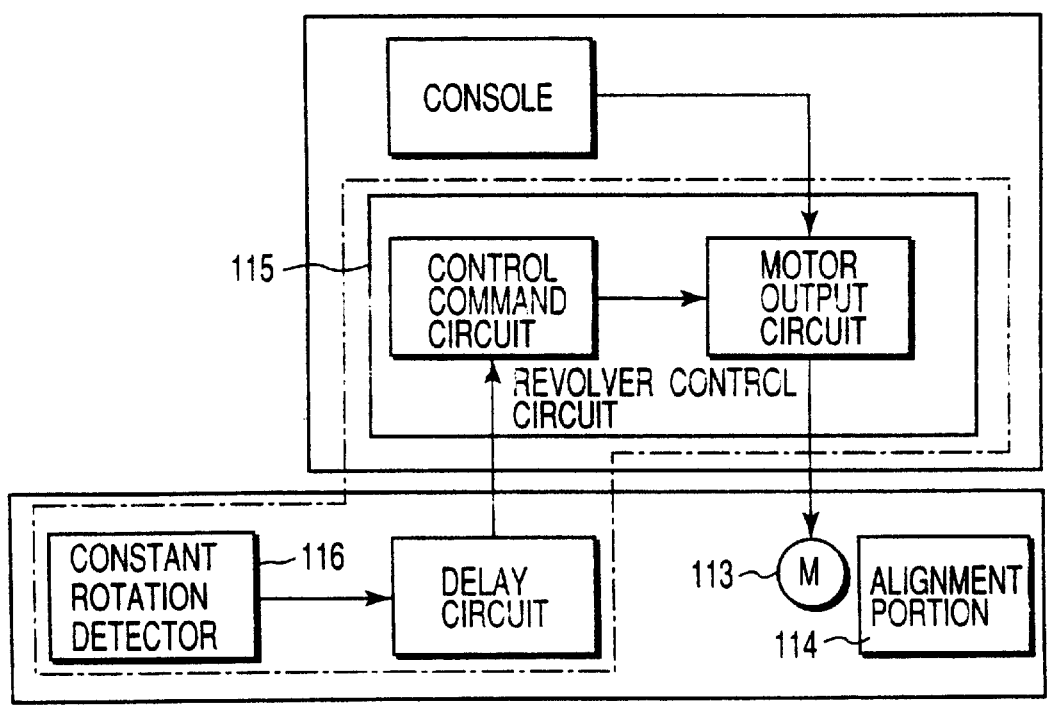
FIG. 3 is a block diagram of a control device for the optical member switching apparatus of prior art 2.
Figure 4:
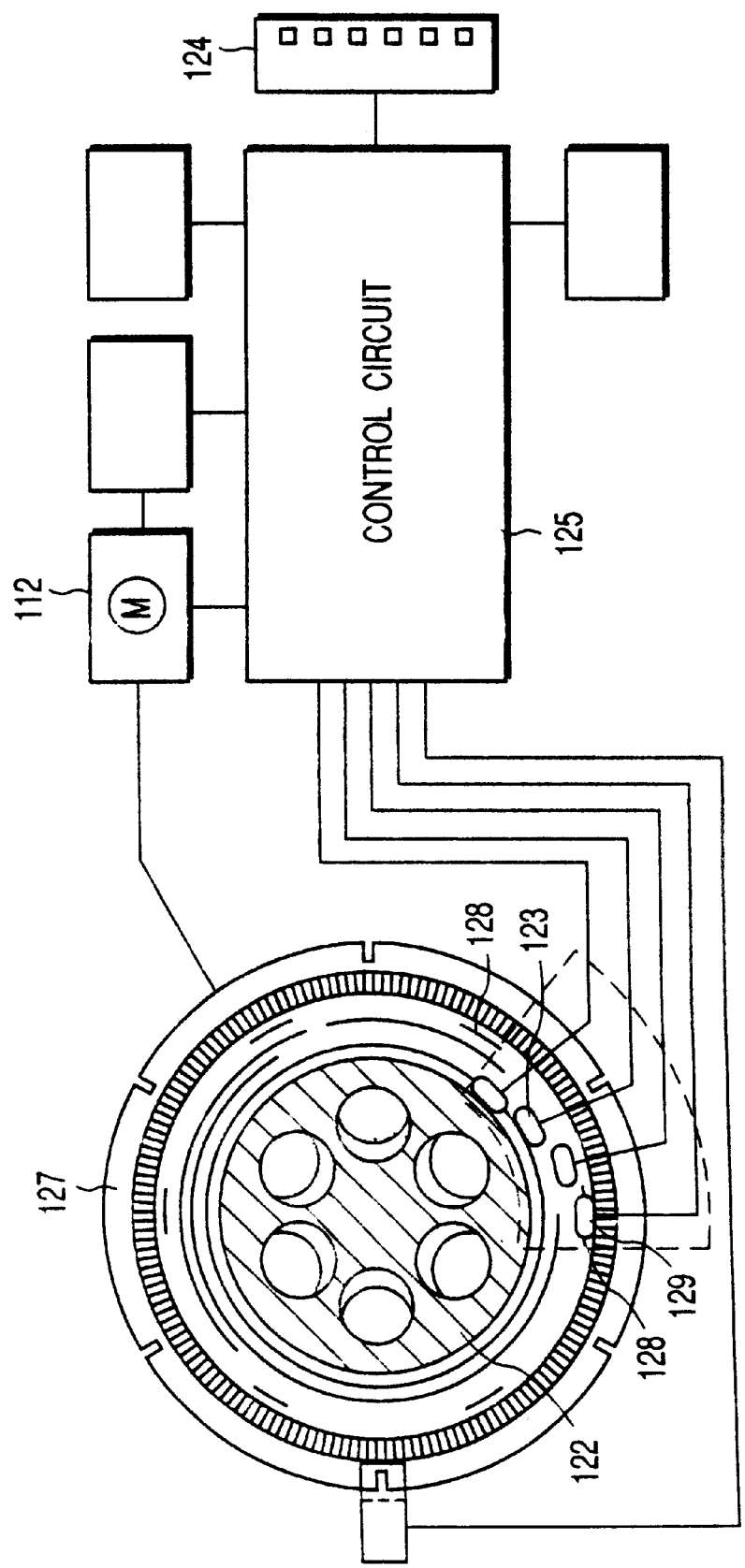
FIG. 4 is a diagram showing the arrangement of an optical member switching apparatus of prior art 3.

In embodiments of the present invention, an objective lens switching apparatus and cube switching apparatus will be exemplified as optical member switching apparatuses, but these apparatuses can be applied to each other's embodiments although their arrangements must be slightly modified before doing so. Embodiments will be explained below. Note that the same reference numerals denote the same parts throughout the embodiments.

Figure 5:
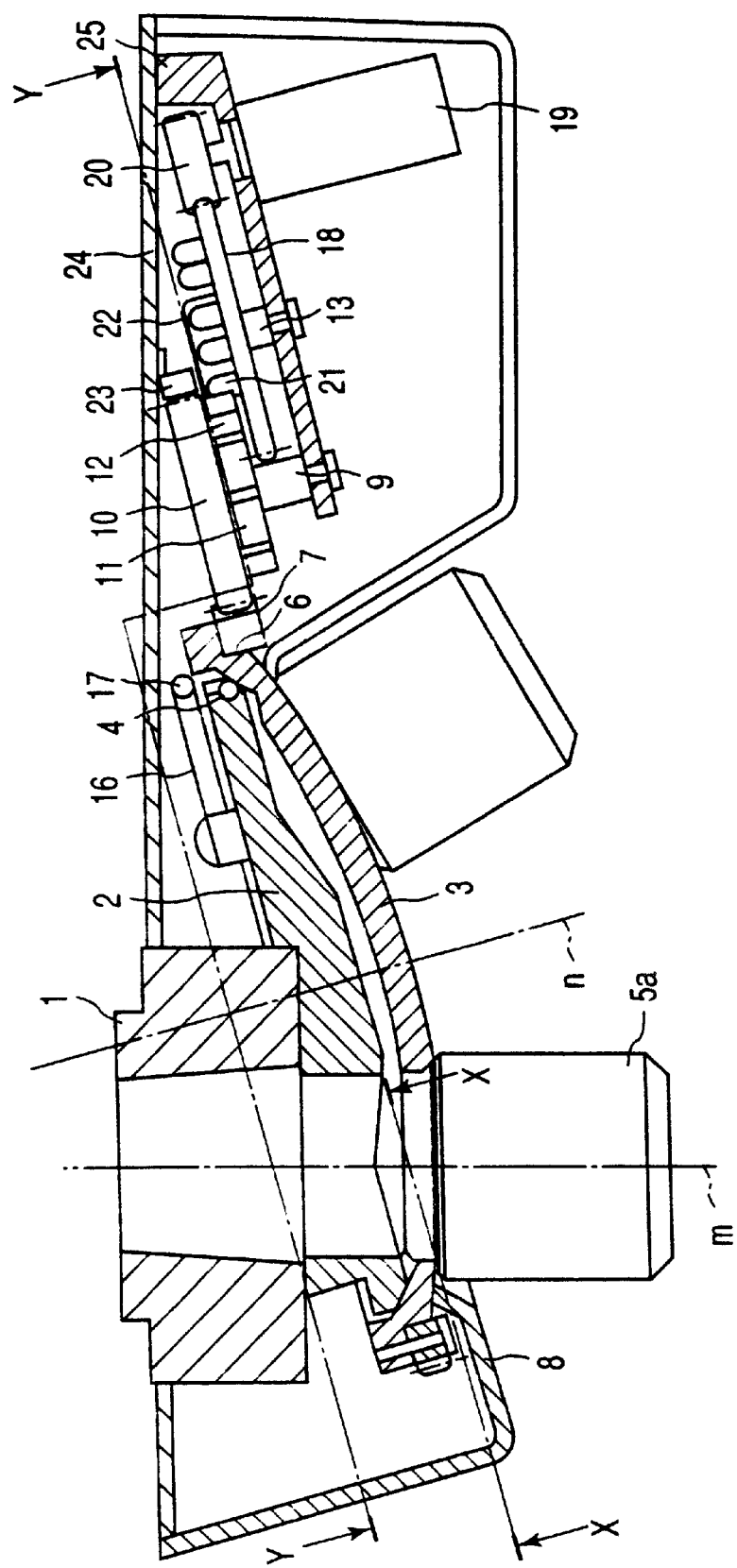
FIG. 5 is a longitudinal sectional view of an objective lens switching apparatus of embodiment 1.
Figure 6:
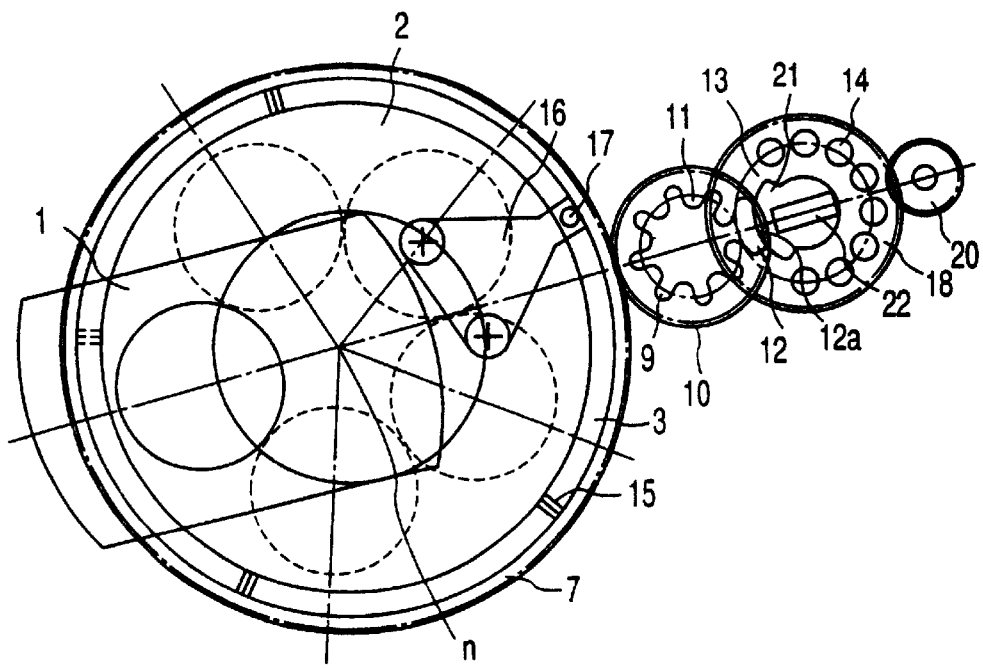
FIG. 6 is a Y—Y sectional view of FIG. 5 of embodiment 1.
Figure 7:
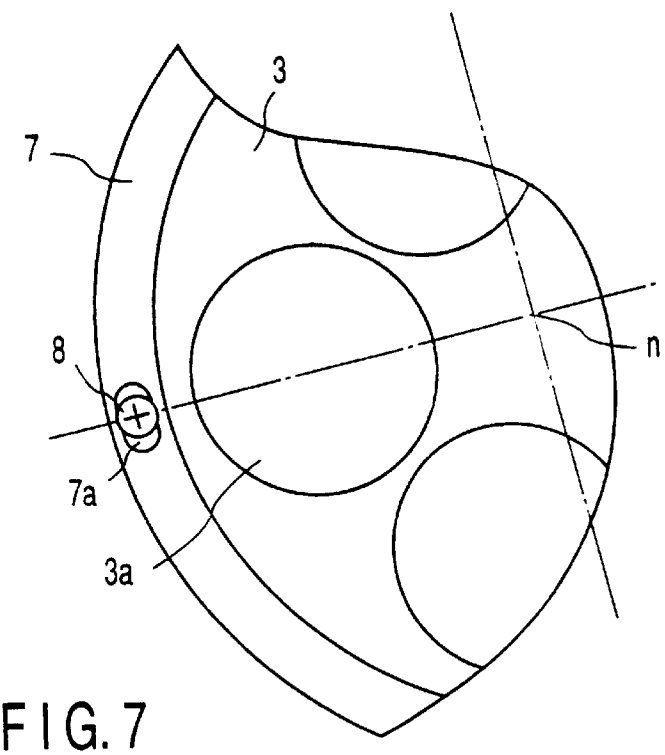
FIG. 7 is an X—X sectional view of FIG. 5 of embodiment 1.
Figure 9:
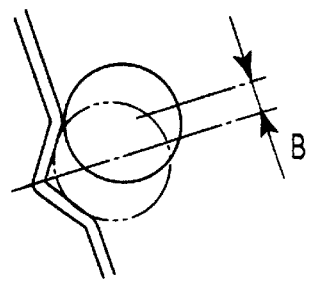
FIG. 9 is a view from an arrow Z shown in FIG. 8.
Figure 10:
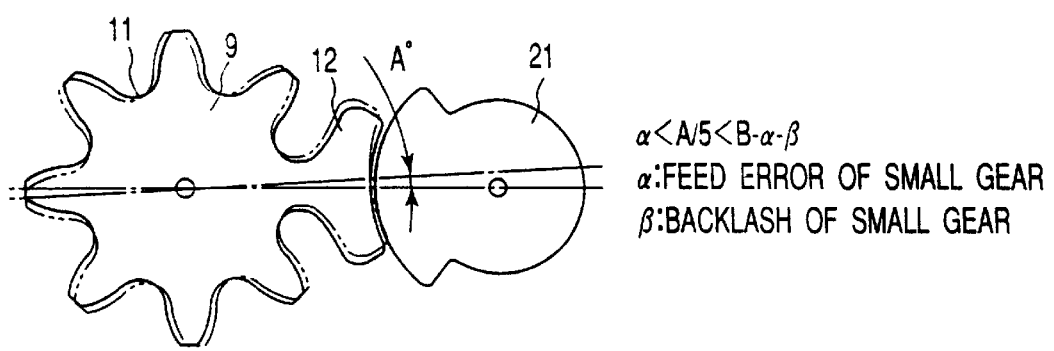
FIG. 10 is a view showing the positional relationship between a driven wheel and a cylindrical portion of a driving wheel.
Figure 11:
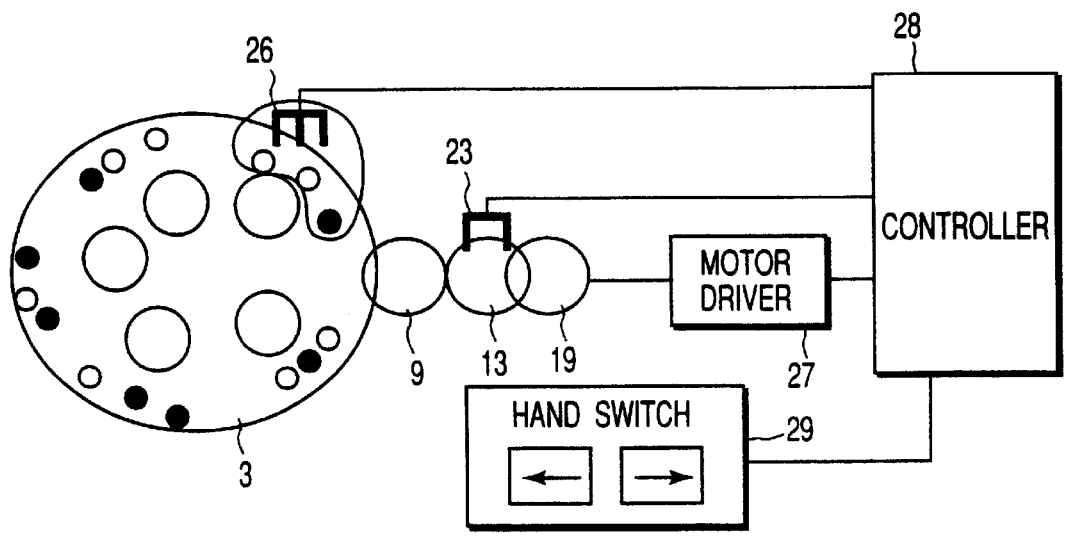
FIG. 11 is a diagram showing the arrangement of a control system of embodiment 1.
Figure 12:
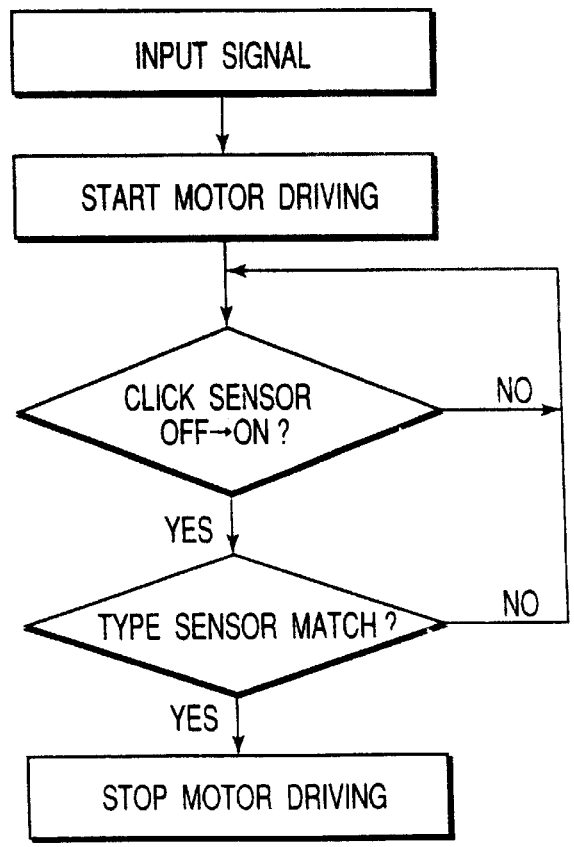
FIG. 12 is a flow chart of the control system of embodiment 1.
Figure 13A:
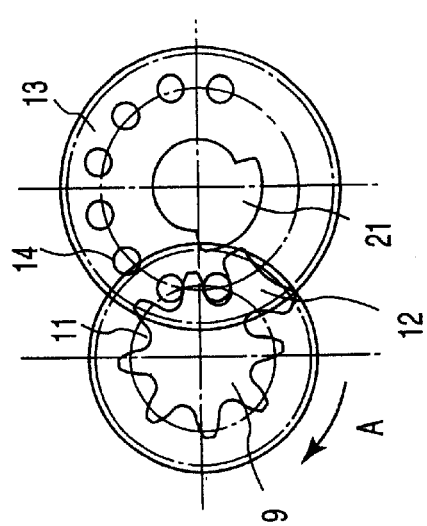
FIGS. 13A to 13F are operation explanatory views of an intermittent operation transmission means of embodiment 1.
Figure 13D:
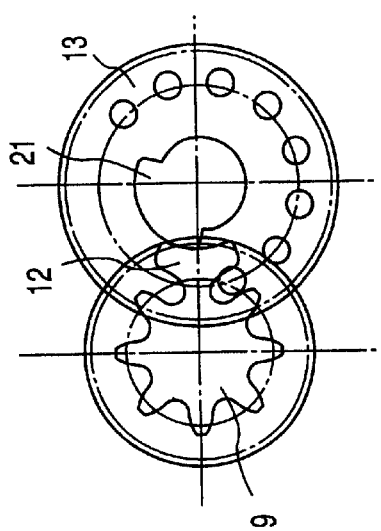
Figure 13B:
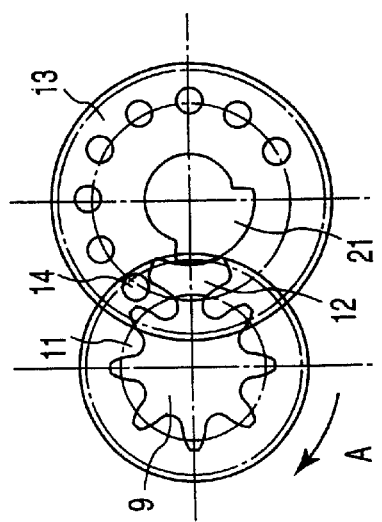
Figure 13E:
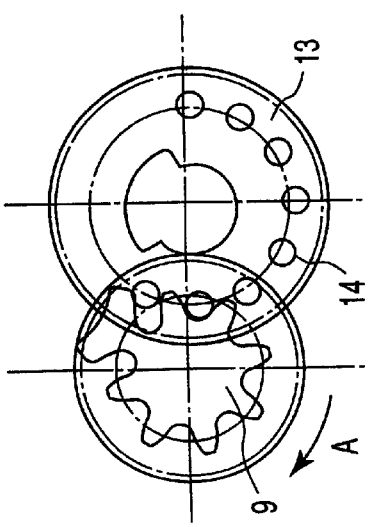
Figure 13C:
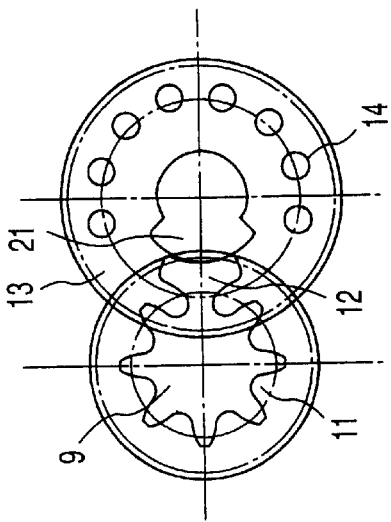
Figure 13F:
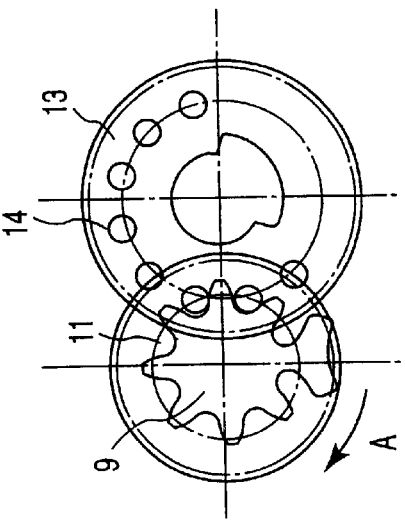
Figure 14:
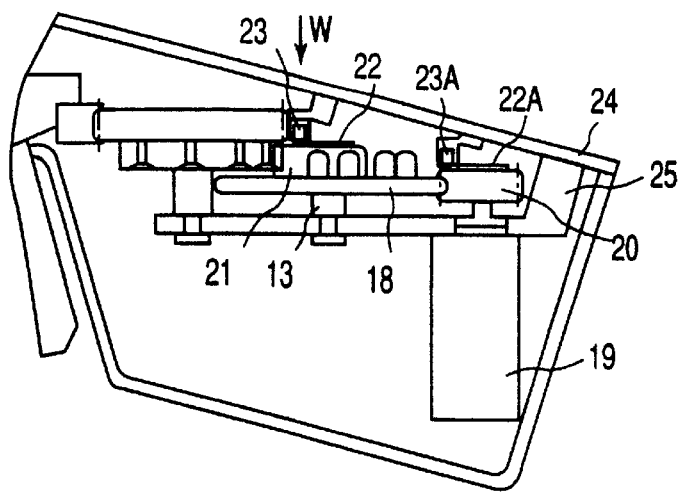
FIG. 14 is a longitudinal sectional view of a modification of embodiment 1.
Figure 15:
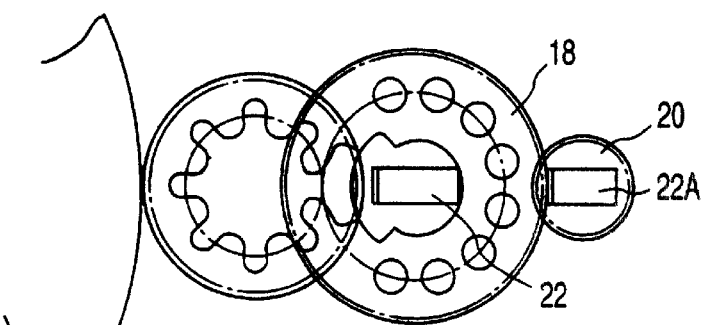
FIG. 15 is a view from an arrow W in FIG. 14 of embodiment 1.

FIGS. 5 to 14 show embodiment 1, in which FIG. 5 is a longitudinal sectional view of an objective lens switching apparatus, FIG. 6 is a Y—Y sectional view of FIG. 5, FIG. 7 is an x—x sectional view of FIG. 5, FIG. 11 is a diagram of a control system, FIG. 12 is a flow chart of the control system, FIGS. 13A to 13F are operation explanatory views of an intermittent operation transmission means, FIG. 14 is a longitudinal sectional view of a modification, and FIG. 15 is a view from an arrow W in FIG. 14.

Referring to FIG. 5, a support member 2 is fixed to an attachment member 1, which is attached to the main body (not shown) of a microscope. A turret 3 serving as a switching member is rotatably supported by the support member 2 via a large number of balls 4 serving as guides. The turret 3 has objective lenses 5a to 5e (some of them are not shown) as a plurality of (five in this embodiment) optical members having different magnifications, and a rotation axis n of the turret 3 tilts 15° with respect to an observation optical axis m of the microscope to separate the objective lens used in observation from a specimen under observation. A large gear 7 fits on a fitting portion 6 formed on the outer periphery of the turret 3, and can be fixed to the turret 3 after its position is adjusted in the circumferential direction by a set screw 8 via an elongated hole 7a (see FIG. 7) formed in the large gear 7.

As shown in FIG. 6, V-grooves 15 corresponding to the number of objective lenses 5a to 5e that can be attached (five lenses in this embodiment) are radially formed on the upper surface of the turret 3 to have the rotation axis n as the center. A leaf spring 16 is fixed to the upper surface of the support member 2, and a click ball 17 is attached to the distal end of the leaf spring 16. The click ball 17 engages with each V-groove 15 while being biased by the elastic force of the leaf spring 16 to align the turret 3 in the circumferential direction. The V-grooves 15, leaf spring 16, and click ball 17 form an alignment means between the turret 3 and support member 2.

In FIG. 5, a support member 24 is attached to the attachment member 1, and a support arm 25 depends from the support member 24. A motor 19, driving wheel 13, and driven wheel 9 are attached to the support arm 25. A small gear 10 is coaxially fixed to the upper surface of the driven wheel 9, and meshes with the large gear 7 fitted on the turret 3. Eight toothed grooves 11 that approximate an epicycloid, and a pigeon tail shaped stationary portion 12, are formed in the driven wheel 9 on the lower surface side of the small gear 10, as shown in FIG. 6.

As shown in FIG. 6, eight engaging pins 14 extend on the driving wheel 13 at the same circumferential pitch as that of the toothed grooves 11 of the driven wheel 9 on a pitch circle diameter, which is 1.5 times that of the eight toothed grooves 11 of the driven wheel 9. That is, since the toothed grooves 11 of the driven wheel 9 are formed at 45° angular intervals, the engaging pins 14 of the driving wheel 13 stand at 30° angular intervals. Hence, the engaging pins 14 stand within a 210° range on the pitch circle diameter of the pins, but no engaging pins stand within the remaining 150° range (near a cylindrical portion 21 to be described below). The cylindrical portion 21 having a shape which is in tight contact with a recessed potion 12a of the pigeon tail shaped stationary portion 12 of the driven wheel 9 stands at the center of the driving wheel 13. A light-shielding portion 22 for detecting the position of the driving wheel 13 is formed on the upper surface of the cylindrical portion 21, and a photointerrupter type sensor 23 is attached to the support member 24 at a position opposing the light-shielding portion 22. The light-shielding portion 22 and sensor 23 form a detection means that detects one revolution of the driving wheel 13. Furthermore, a spur gear 18 is formed on the outer circumferential surface of the driving wheel 13, and meshes with a motor gear 20 attached to the output shaft of the motor 19, thus achieving power transmission. The driving wheel 13 and driven wheel 9 construct an intermittent operation transmission means.

For these members, the positional adjustment between the turret 3 and large gear 7 as meshing adjustment is done by means of the set screw 8 that fits into the elongated hole 7a, so that the central portion of the recessed portion 12a of the stationary portion 12 of the driven wheel 9 matches that of the cylindrical portion 21 of the driving wheel 13 (see FIG. 6) in a state wherein one of the objective lenses 5a to 5e is aligned on the observation optical axis m, i.e., the click ball 17 biased by the leaf spring 16 engages with the corresponding V-groove 15. A gap is formed between the cylindrical portion 21 of the driving wheel 13 and the stationary portion 12 of the driven wheel 9. The gap is larger than the feed error (accumulated pitch error) of the small gear 10 and is smaller than a pull-in amount by which the click ball 17 dropped the v-groove 15 by the biasing force even when the center of the V-groove 15 is different from that of the click ball 17 biased by the leaf spring 16.

Figure 8:
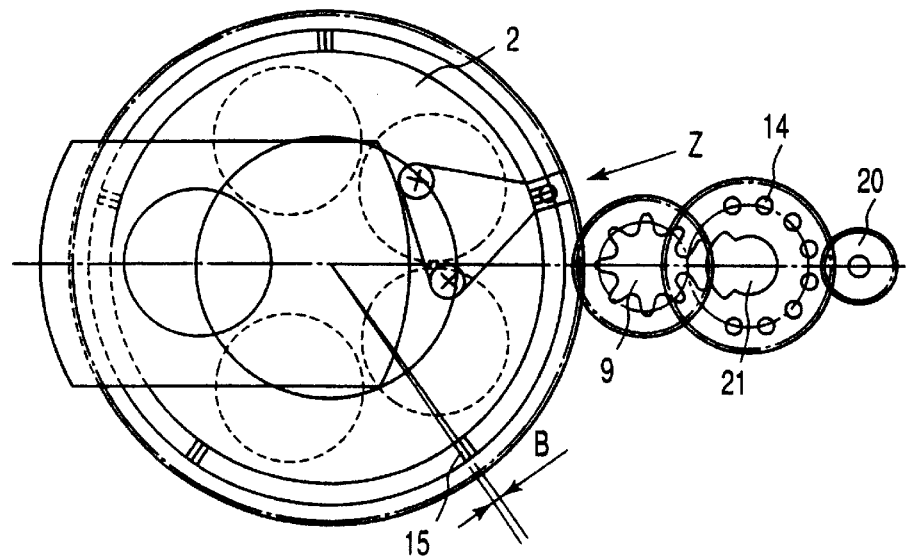
FIG. 8 is a view showing a pull-in amount B of a V-groove 15 in the Y—Y sectional view of FIG. 5 shown in FIG. 6 of embodiment 1.

FIG. 8 shows the pull-in amount B of the V-groove 15 in the Y—Y sectional view of FIG. 5 shown in FIG. 6, and FIG. 9 is a view from an arrow Z shown in FIG. 8 and shows details of a click portion. Also, FIG. 10 shows the positional relationship between the driven wheel and the cylindrical portion of the driving wheel.

Let $\alpha$ be the error of the small gear, $\beta$ be the backlash of the small bear, A be the rotational angle of the driven wheel 9 defined by the gap between the cylindrical portion 21 of the driving wheel 13 and the stationary portion 12 of the driven wheel 9, and B be the pull-in amount of the V-groove 15. Then, they satisfy:

$$\alpha < A/5 < B - \alpha - \beta$$

According to this optical member switching apparatus, the driven wheel 9 is intermittently rotated by continuous rotation of the driving wheel 21, and accurate position detection can be achieved without being influenced by any mechanical errors of gears and the like.

The control system of the objective lens switching apparatus will be explained below. In FIG. 11, three hole sensors and magnets (unit: 3 bits) are attached to the outer periphery of the turret 3 to construct a type sensor 26 that generates a signal in correspondence with the attached hole position of the objective lens. The attached hole of an objective lens located at the observation optical axis m can be recognized by this type sensor 26. Also, the sensor 23 (see FIG. 5) for detecting the rotational angle of the driving wheel 13 mentioned above detects the rotational angle of the driving wheel 13, thus allowing accurate alignment. A controller 38 determines the rotation direction and amount of the turret 3 on the basis of two signals from the sensor 23 and type sensor 26, and a signal from an external input means such as hand switches 29 or the like, and sends a signal to a motor driver 27. Note that the hand switches 29 in FIG. 11 include a switch for switching the optical members in the forward direction, and one for switching them in the reverse direction, but switches corresponding to the number of optical members (the number of revolvers) may be provided. As shown in FIG. 12, when the signal from the sensor 23 for the driving wheel 13 is ON, and the signal from the type sensor 26 matches, driving of the motor 19 is stopped.

The operation of the intermittent operation transmission means will be explained below using FIGS. 13A to 13F.

FIG. 13A shows the relationship between the driven wheel 9 and driving wheel 13 in a state wherein one of the objective lenses 5a to 5e is aligned to the observation optical axis m, i.e., the click ball 17 biased by the leaf spring 16 engages with the V-groove 15. Since the stationary portion 12 of the driven wheel 9 and the cylindrical portion 21 of the driving wheel 13 oppose each other via a gap, the driven wheel 9 can rotate through a rotational angle corresponding to the gap. However, since this rotational angle is smaller than the pull-in amount of the V-groove 15, the driven wheel 9 suffers clattering, but the click ball 17 has dropped to the center of the V-groove 15, and the turret 3 is accurately aligned. In this state, even when the driving wheel 13 begins to rotate, the driven wheel 9 does not rotate. This period corresponds to a margin for the motor stop precision.

FIG. 13B shows a state wherein one engaging pin 14 contacts one toothed groove 11 of the driven wheel 9 while the driving wheel 13 has rotated a given amount. In the states shown in FIGS. 13A and 13B, rotation of the driving wheel 13 is not transmitted to the driven wheel 9. Also, as the engaging pin 14 contacts the toothed groove 11 that neighbors the stationary portion of the driven wheel 9 from a direction near a tangent, the rotational force of the driving wheel 13 is gradually transmitted to the driven wheel 9 at the time of contact, resulting in a small shock. While the engaging pin 14 contacts the toothed groove 11, as the end portion of the cylindrical portion 21 of the driving wheel 13 is located beneath the central position of the recessed portion 12a (see FIG. 6) of the stationary portion 12 of the driven wheel 9 on the plane of paper of FIG. 13B, the driven wheel 9 can rotate in the direction of an arrow A.

In the state shown in FIG. 13C, the driving wheel 13 has further rotated. The cylindrical portion 21 of the driving wheel 13 completely disengages from the stationary portion 12 of the driven wheel 9. In subsequent FIGS. 13C to 13E, since the engaging pins 14 of the driving wheel 13 engage in turn with the toothed grooves 11 of the driven wheel 9, and rotate, the driven wheel 9 rotates in the direction of the arrow A. The rotational speed of the driven wheel 9 during this period is constant.

In the state shown in FIG. 13F, the driven wheel 9 completes one revolution from FIG. 13A, and the cylindrical portion 21 of the driving wheel 13 begins to engage with the stationary portion 12 of the driven wheel 9 to stop rotation of the driven wheel 9. Contrary to the beginning of rotation, since each engaging pin 14 of the driving wheel 13 leaves the toothed groove 11 of the driven wheel 9 in a direction near the tangential direction of rotation, the rotation of the driving wheel 13 is not satisfactorily transmitted to the driven wheel 9, thus providing a deceleration effect before stop.

When the driving wheel 13 has further rotated, the sensor 23 detects the light-shielding portion 22 provided to the cylindrical portion 21 of the driving wheel 13 to detect rotation of the driving wheel 13, thus stopping power supply to the motor 19. In this manner, the driven wheel 9 has completed one revolution and returns to the state shown in FIG. 13A, and the turret 3 completes ⅕ revolution in accordance with the gear ratio of the small gear 10 to the large gear 7 (1:5 in this embodiment), thereby switching the objective lens.

The motor 19 has no strict stop precision requirement, since it need only stop rotation within the range in which the end portion of the cylindrical portion 21 of the driving wheel 13 does not fall outside the central position of the stationary portion 12 of the driven wheel 9 even after power supply is stopped. That is, the motor 19 can have low stop precision, and an inexpensive DC geared motor can be used. Since the driven wheel 9 is accelerated/decelerated upon rotation of the driving wheel 13 and produces a small shock at the beginning of rotation and at the time of stop, it generates less noise, and has excellent durability. Since rotation is restricted by the recessed portion of the driven wheel and the cylindrical portion of the driving wheel, if a motor having a torque margin is selected, reliable switching can be achieved without being influenced by the attached load.

In this embodiment, as shown in FIGS. 14 and 15, the light-shielding portion 22 is formed on the driving wheel 13, and the sensor 23 is attached to the support member 24 to oppose the portion 22, thus obtaining a signal for stopping the motor 19. Alternatively, a light-shielding portion 22A may also be formed on the motor gear 20, and a sensor 23A may be attached to the support member 24 to oppose the portion 22A. In this case, the gear ratio of the spur gear 18 of the driving wheel 13 to the motor gear 20 of the motor 19 is set at 4:5. Upon making one revolution of the driving wheel 13 to switch the objective lens, the motor gear 20 rotates through a ⅘ revolution. When the driving wheel 13 makes five revolutions in a given direction, the motor gear 20 makes four revolutions, and the light-shielding portion 22A returns to an initial position. That is, since the light-shielding portion 22 of the driving wheel 13 and the light-shielding portion 22A of the motor gear 20 are simultaneously detected, and a predetermined objective lens is always aligned to the observation optical axis m at that position, these portions can be used as an origin sensor. In case of a revolver which is obliquely attached to the microscope main body, a problem posed by a position sensor which is used in a turret mechanism and requires wiring in a narrow space can be solved.

According to this embodiment, the turret can be accurately aligned by the mechanical means irrespective of the stop precision of the control system and motor. For this reason, since the control system can be simplified and easy assembly is assured, a cost reduction can be achieved. Furthermore, since the motor as the driving source is not required of high stop precision, an inexpensive motor can be used, thus achieving a great cost reduction. Since this embodiment is not influenced by different attached loads or switching times (speeds), it can be applied to many units. Also, a highly reliable switching mechanism can be provided due to the simplicity of the latter (control system and assembly) and margins (load and time) of the former (mechanism).

Embodiment 2

Figure 16:
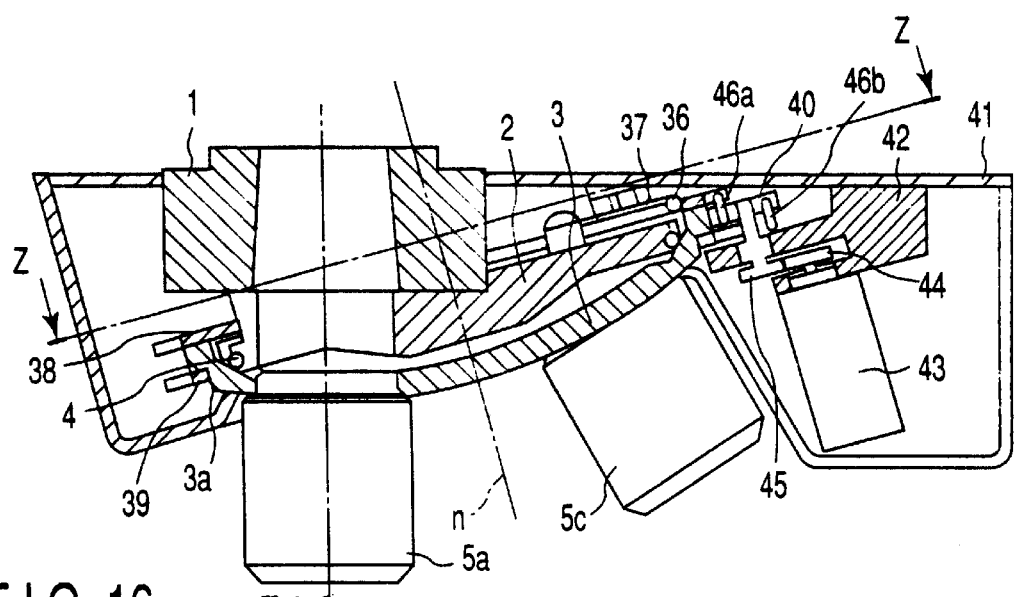
FIG. 16 is a longitudinal sectional view of an objective lens switching apparatus of embodiment 2.
Figure 17:
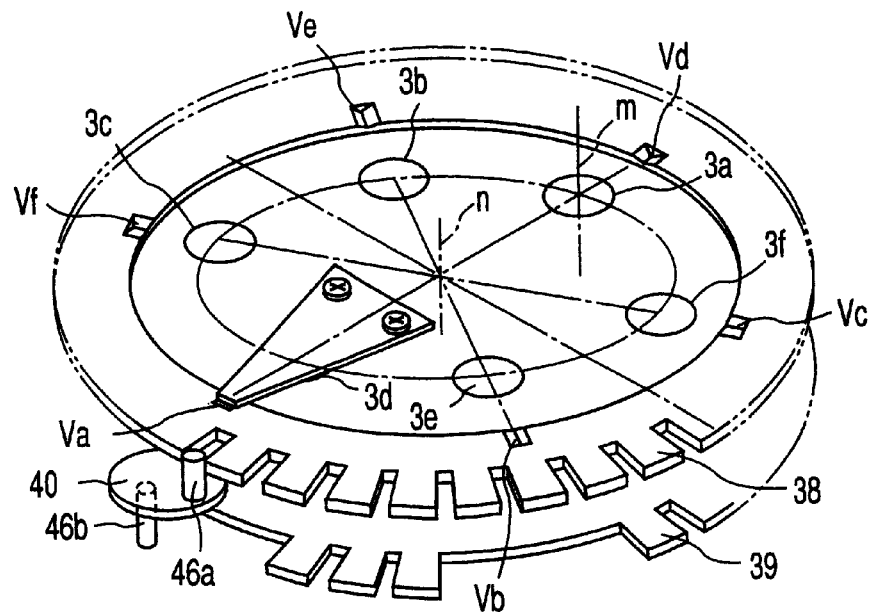
FIG. 17 is a perspective view of an intermittent operation transmission means of embodiment 2.
Figure 18:
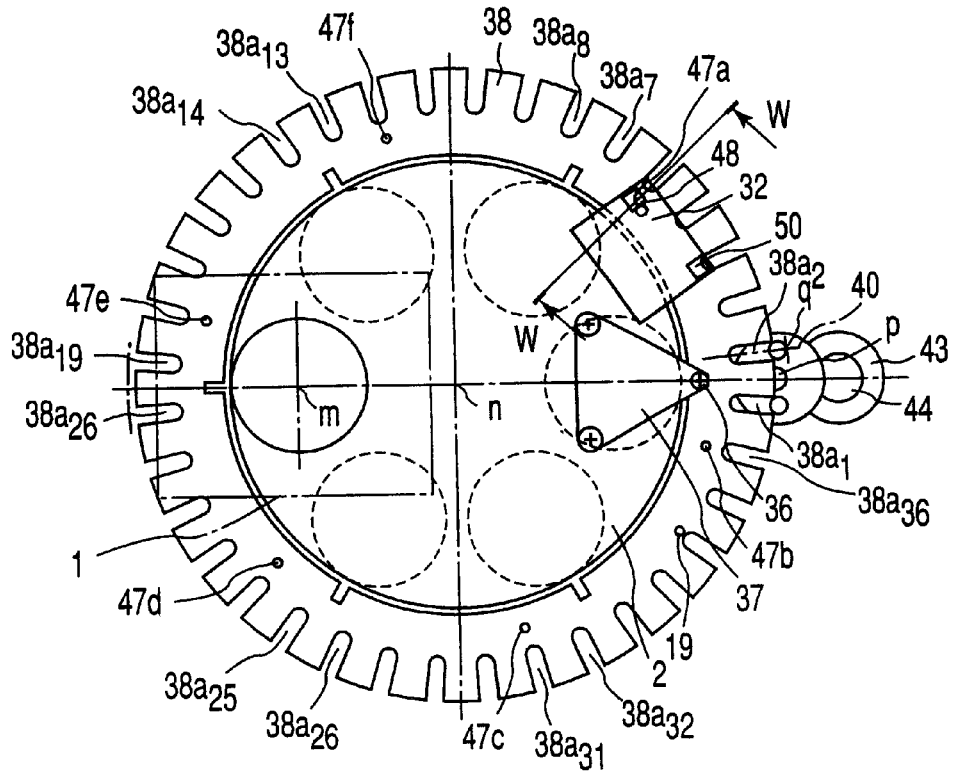
FIG. 18 is a Z—Z sectional view of FIG. 16 of embodiment 2.
Figure 22:
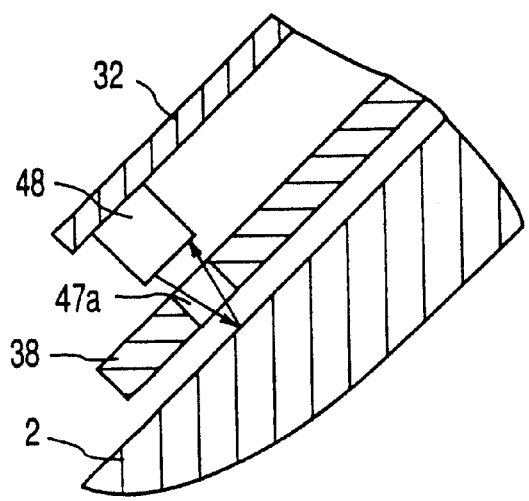
FIG. 22 is a W—W sectional view of FIG. 18 of embodiment 2.

FIGS. 16 to 22 show embodiment 2, in which FIG. 16 is a longitudinal sectional view of an objective lens switching apparatus, FIG. 17 is a perspective view of an intermittent operation transmission means, FIG. 18 is a Z—z sectional view of FIG. 16, FIG. 19 is a perspective view showing the first state of the objective lens switching operation, FIG. 20 is a perspective view showing the second state of the objective lens switching operation, FIG. 21 is a perspective view showing the third state of the objective lens switching operation, and FIG. 22 is a W—W sectional view of FIG. 18.

Referring to FIG. 16, a support member 2 is fixed to an attachment member 1, which is attached to a main body (not shown) of a microscope. A turret 3 serving as a switching member is rotatably supported by the support member 2 via a large number of balls 4 serving as guides. The turret 3 has objective lenses 5a to 5f (some of them are not shown) as a plurality of (six in this embodiment) optical members having different magnifications, and a rotation axis n of the turret 3 tilts 15° with respect to an observation optical axis m of the microscope to separate the objective lens used in observation from a specimen under observation.

On the outer periphery of the turret 3, first and second driven wheels 38 and 39 are respectively attached to the upper and lower surface sides. As shown in FIG. 17, alignment grooves Va to Vf corre-sponding to six objective lens attachment portions 3a to 3F are radially formed on the inner periphery of the first driven wheel 38. On the other hand, in FIG. 18, a leaf spring 37 to the distal end of which a click ball 36 is fixed is attached to the upper surface of the support member 2. The leaf spring 37 presses the click ball 36 against each of the alignment grooves Va to Vf on the inner periphery of the first driven wheel 38. When the click ball 36 engages with one of the alignment grooves Va to Vf, the corresponding one of the objective lenses 5a to 5f attached on the turret 3 accurately agrees with the observation optical axis m. These leaf spring 37, click ball 36, and alignment grooves Va to Vf construct an alignment means which contacts between the turret 3 and support member 2 with a predetermined engaging force.

As shown in FIG. 18, engaging grooves $38a_1$ to $38a_{36}$ corresponding to an integer multiple (36 grooves in this embodiment) of the number of objective lenses 5a to 5f attached (six lenses in this embodiment) are radially formed at equal intervals on the outer periphery of the first driven wheel 38 to have the rotation axis n as the center. Engaging grooves $39b_1$ to $39b_{36}$ are also formed on the outer periphery of the second driven wheel 39 like on the first driven wheel 38, but engaging grooves (a total of 12 positions of $39b_1$, $39b_2$, $39b_7$, $39b_8$, $39b_{13}$, $39b_{14}$, $39b_{19}$, $39b_{20}$, $39b_{25}$, $39b_{26}$, $39b_{31}$, and $39b_{32}$) on the two sides of a line that connects the rotation axis n of the turret 3 and a rotation axis p of a driving wheel 40 while each of the objective lenses 5a to 5f is aligned to the observation optical axis are absent (corresponding portions are indicated by two-dashed chain lines of $38a_1$, $38a_2$, $38a_7$, . . . in FIG. 18).

In FIG. 16, a fixing plate 41 extends from the attachment member 1, and a motor 43 is attached to the fixing plate 41 via a motor fixing member 42. A motor gear 44 is attached to the rotation shaft of the motor 43. Also, the driving wheel 40 is rotatably attached to the motor fixing member 42. A spur gear 45 is fixed to the lower end of the driving wheel 40, and meshes with the motor gear 44, so that the driving force of the motor 43 is transmitted to the driving wheel 40. The rotation axis p of the driving wheel 40 is located at a position where a line that connects the observation optical axis m and the rotation axis n of the turret 3, intersects with a tangent to an intersection q between the central line of the engaging groove 38a and the outer diameter line of the driven wheel 38. Also, as shown in FIG. 19, two engaging pins 46a and 46b stand upright at positions symmetrical about the rotation axis p on a circumference having the distance between the rotation axis p and intersection q as a radius on the upper and lower surfaces of the driving wheel 40. The engaging pins 46a and 46b engage with the engaging grooves $38a_1$ to $38a_{36}$ of the first driven wheel 38 and the engaging grooves $39b_3$ to $39b_{36}$ (some grooves are absent, as described above) of the second driven wheel 39 to intermittently transmit the rotation of the driving wheel 40 to the turret 3. The driving wheel 40 and the first and second driven wheels 38 and 39 construct an intermittent operation transmission means.

As shown in FIGS. 18 and 22, a detection sensor 48 is disposed on an attachment plate 32 attached to the upper surface of the support member 2 to oppose detection holes 47a to 47f formed on a circumference inside the engaging grooves 38a, to $38a_{36}$ of the first driven wheel 38. Each of the detection holes 47a to 47f is adjusted to match the detection sensor 48 when one of the objective lenses 5a to 5f is aligned to the observation optical axis m. The circumference near the detection holes 47a to 47f is painted black to prevent reflection. Light coming from the detection sensor 48 passes through the detection holes 47a to 47f, is reflected by the upper surface of the support member 2, and is received by the detection sensor 48. With this signal, completion of rotation of the turret 3 is detected, and the motor 43 (see FIG. 16) is stopped. The detection holes 47a to 47f and detection sensor 48 form a detection means. An origin hole (not shown) is formed on a circumference on the slightly outer side of the detection holes 47a to 47f, and an origin detection sensor 50 is disposed on the attachment plate 32 to oppose this origin hole. Since the operation of this sensor and hole is the same as that of the detection holes 47a to 47f and detection sensor 48, a detailed description thereof will be omitted.

The operation of the turret 3 upon rotation of the driving wheel 40 will be explained below using FIGS. 18 to 21 taking as an example wherein the objective lens 5a is switched to the objective lens 5b.

① In FIG. 19, the driving wheel 40 begins to rotate in the direction of the arrow A from the state wherein the objective lens 5a is aligned to the observation optical axis m, and the engaging pin 46a engages with the engaging groove $38a_1$ of the first driven wheel 38 to rotate the first driven wheel 38 and turret 3 in the direction of an arrow B. Since the driving wheel 40 and the engaging groove $38a_1$ engage with each other through 170° (the rotation range of 10° for the first driven wheel 38) as the rotational angle of the driving wheel 40, the turret 3 rotates through 10° from the initial state in the direction of the arrow B. Since the engaging pin 46a engages with the engaging groove $38a_1$ of the first driven wheel 38 from a contact direction and disengages therefrom in the contact direction, the angular velocity of the first and second driven wheels 38 and 39, i.e., the turret 3 by the driving wheel 40 is zero from the beginning to the end, and the angular acceleration is small. Hence, the turret 3 smoothly moves and stops due to the resistance between the click ball 36 and driven wheel 38, and that between the turret 3 and balls 4.

② When the driving wheel 40 has further rotated 10° (180° as the rotational angle from the initial state; not shown), the engaging pin 46b of the driving wheel 40 is located within the outer periphery of the second driven wheel 39. However, since the engaging groove $39b_2$ corresponding to the engaging groove $38a_2$ of the first driven wheel 38 is absent, rotation of the driving wheel 40 is not transmitted. Hence, the turret 3 maintains its position 10° rotated from the initial state.

③ As shown in FIG. 20, when the driving wheel 40 has rotated another 180°, the engaging pin 46a of the driving wheel 40 engages with the engaging groove $38a_2$ of the first driven wheel 38, and the turret 3 further rotates through 10° as in ①. That is, the turret 3 completes its rotation through 20° from the initial state.

④ As shown in FIG. 21, when the driving wheel 40 has rotated another 180°, the engaging pin 46b of the driving wheel 40 engages with the engaging groove $39b_2$ of the second driven wheel 39, and the second driven wheel 39, i.e., the turret 3 rotates through 10°. That is, the turret 3 completes its rotation through 30° from the initial state.

⑤ By further repeating states ③, ④, and ③, the turret 3 completes its rotation through 60° from the initial state.

⑥ When the driving wheel 40 has rotated another 180°, the engaging pin 46b of the driving wheel 40 cannot rotate the second driven wheel 39 as in ②.

When the turret 3 has rotated through 60° (at the end of ⑤), since the click ball 36 fixed to the distal end of the leaf spring 37 attached to the upper surface of the support member 2 falls within the pull-in range of the alignment groove Vb of the first driven wheel 38, the click ball 38 engages with the alignment groove Vb by the elastic force of the leaf spring 37, and the optical axis of the objective lens 5b accurately agrees with the observation optical axis m, thus switching the lens from the objective lens 5a to the objective lens 5b. At this time, the detection sensor 48 receives light which has passed through the detection hole 47b and has been reflected by the upper surface of the support member 2, and the motor 43 is stopped based on the signal from this sensor.

According to this embodiment, the turret can be accurately aligned by the mechanical means irrespective of the stop precision of the control system and motor. For this reason, since the control system can be simplified and easy assembly is assured, a cost reduction can be achieved. Furthermore, since the motor as the driving source is not required of high stop precision, an inexpensive motor can be used, thus achieving a great cost reduction. Since this embodiment is not influenced by different attached loads or switching times (speeds), it can be applied to many units. Also, a highly reliable switching mechanism can be provided due to the simplicity of the latter (control system and assembly) and margins (load and time) of the former (mechanism). Furthermore, the dead zone (the angle through which the driven wheel does not rotate) of the driving wheel can be narrowed down in an engaging groove which does not require any driven wheel other than an alignment portion, the moving time of the driven wheel can be shortened.

Embodiment 3

Figure 23:
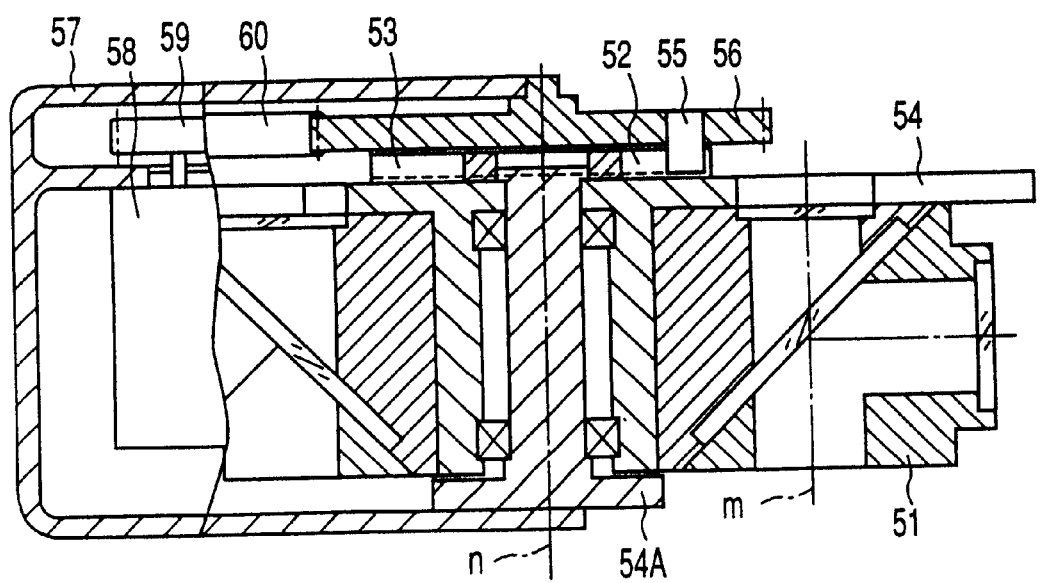
FIG. 23 is a longitudinal sectional view of a cube switching apparatus of embodiment 3.
Figure 24:
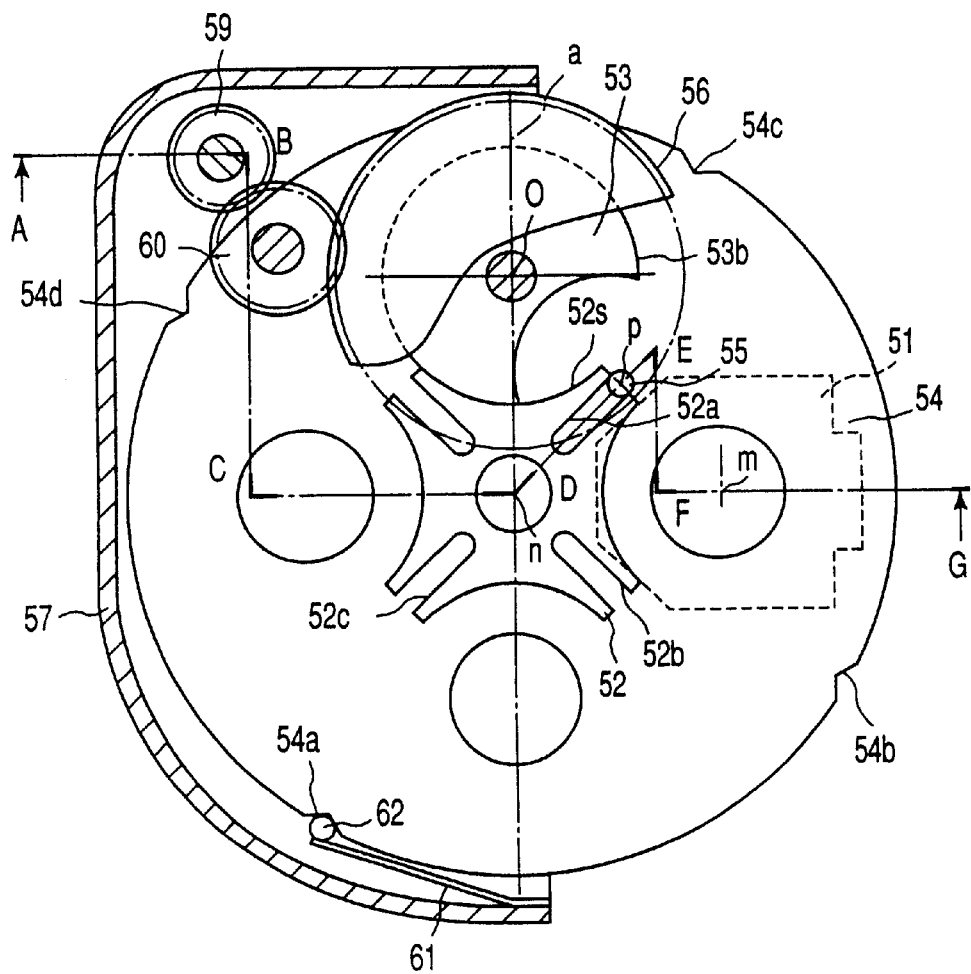
FIG. 24 is a plan view of the cube switching apparatus of embodiment 3.
Figures 25A, 25B, 25C, 25D:
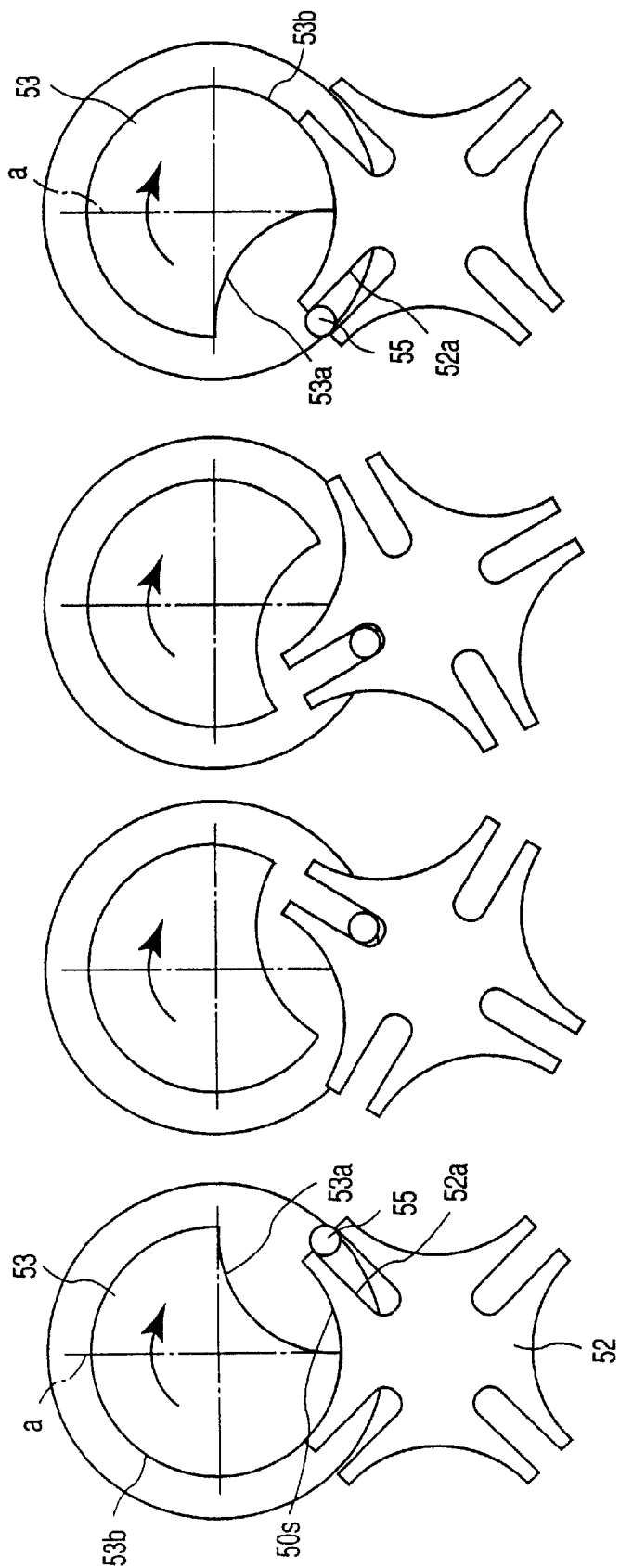
FIGS. 25A to 25D are operation explanatory views of an intermittent operation transmission means of embodiment 3.

FIGS. 23 to 25 show embodiment 3, in which FIG. 23 is a longitudinal sectional view of a cube switching apparatus, FIG. 24 is a plan view of the cube switching apparatus, and FIGS. 25A to 25D are operation explanatory view of an intermittent operation transmission means.

Referring to FIGS. 23 and 24, a turret 54 to which a plurality of (four in this embodiment) cubes 51 serving as optical members can be attached is disposed on an external member 57 of a cube switching apparatus to be rotatable about a shaft 54A. A driven wheel 52 is integrally fixed on the turret 54. Engaging grooves 52a to 52d corresponding to the number of cubes 51 that can be attached are formed on the driven wheel 52 radially toward the outer periphery. While a given cube 51 is located on an observation optical axis m, the engaging grooves 52a to 52d have a tilt of 45° with respect to a line that connects a rotation axis n of the turret 54 and the observation optical axis m. A driving wheel 53 is disposed on a line a which is perpendicular to the line that connects the rotation axis n of the turret 54 and the observation optical axis m. A rotation axis o of the driving wheel 53 is located on the intersection between the line a and a tangent to an intersection p between the central line of the engaging groove 52a and the contour line of the driven wheel 52. A large gear 56 is integrally fixed on the upper surface of the driving wheel 53, and one engaging pin 55 depends from the large gear 56 onto a circumference having the distance between the rotation axis o and intersection p as a radius. The engaging pin 55 can engage with one of the engaging grooves 52a to 52d.

The driving wheel 53 rotates, and the rotation of the driving wheel 53 is transmitted within the range wherein the engaging pin 55 of the driving wheel 53 engages with the engaging groove 52a of the driven wheel 52 (90° for the driving wheel 53, 90° for the driven wheel). At the position where the engaging pin 55 rotates clockwise, and begins to engage with the engaging groove 52a, since the end portion of a recessed portion 53a of the driving wheel 53 is located at the central position (on the line a) of an engaging recessed portion 52s of the driven wheel 52, the driven wheel 52 can be rotated by the driving wheel 53. Outside the rotation range, since the engaging recessed portion 52s of the driven wheel 52 contacts an outer diameter portion 53b of the driving wheel 53, the driven wheel 52 is fixed in position. The driving wheel 53 and large gear 56 are rotatably supported by the external member 57. The driving wheel 53, large gear 56, and driven wheel 52 construct an intermittent operation transmission means.

A motor 58 is attached to the external member 57, and a motor gear 59 is attached to the rotation shaft of the motor 58. The motor gear 59 meshes with an intermediate gear 60 rotatably supported by the external member 57, and the intermediate gear 60 meshes with the large gear 56, so that the driving force of the motor 58 is transmitted to the driving wheel 53. The outer diameter portion 53b of the driving wheel 53 and the engaging recessed portion 52s of the driven wheel 52 have a slight clattering therebetween. For this reason, a leaf spring 61 fixed to the external member 57, and a click ball 62 fixed to the distal end of the leaf spring 61 are provided, and V-grooves 54a to 54d are formed on the turret 54. An alignment means is constructed to accurately detect the position of the turret 54 when the click ball 62 biased by the elastic force of the leaf spring 61 engages with one of the V-grooves 54a to 54d. Note that a detection sensor and detection mark (neither are shown) are provided to the turret, and a detection means is constructed so that the signal from the detector stops the motor 58 via a control device.

The operation of the intermittent operation transmission means will be described below using FIGS. 25A to 25D. In the state shown in FIG. 25A, the engaging pin 55 of the driving wheel 53 begins to engage with the engaging groove 52a of the driven wheel 52. At this time, the engaging recessed portion 52s of the driven wheel engages with the outer diameter portion 53b of the driving wheel 53, but since the end portion of the recessed portion 50a of the driving wheel 53 is located at the central position (on the line a) of the engaging recessed portion 52s, the engaging pin 55 rotates in the direction of an arrow A and enters the engaging groove 52a, and the driven wheel 52 rotates in the direction of an arrow B. The rotation progresses through FIGS. 25B and 25C, and reaches the state shown in FIG. 25D. That is, when the engaging pin 55 leaves the engaging groove 52a of the driven wheel 52, the end portion of the recessed portion 50a is located at the central position (on the line a) of the engaging recessed portion 52s of the driven wheel 52, and the driven wheel 52 cannot be rotated since the engaging recessed portion 52s contacts the outer diameter portion 53b of the driving wheel 53 even when the driving wheel 53 rotates. However, as described above, since the outer diameter portion 53b of the driving wheel 53 and the engaging recessed portion 52s of the driven wheel 52 have slight clattering therebetween, the position of the turret 54 can be accurately determined by engagement between the click ball 62 and the V-grooves 54a to 54d.

As described above, the driven wheel makes ¼ revolution during ¼ revolution of the driving wheel 53, and the driven wheel 52 stands still during the remaining ¾ revolution of the driving wheel 53, thus achieving intermittent transmission. The motor 58 is stopped by a signal from the detection means comprising the detection sensor and detection mark (neither are shown) during the ¾ revolution of the driving wheel 53.

According to this embodiment, the control system can be switched by a mechanical means irrespective of the stop precision of the motor, and a cube can be reliably switched without being influenced by a change in attached state of cubes. Also, since a large gear is used as the driving wheel, the desired torque of the motor can be reduced, and the entire apparatus can be rendered compact.

Embodiment 4

Figure 26:
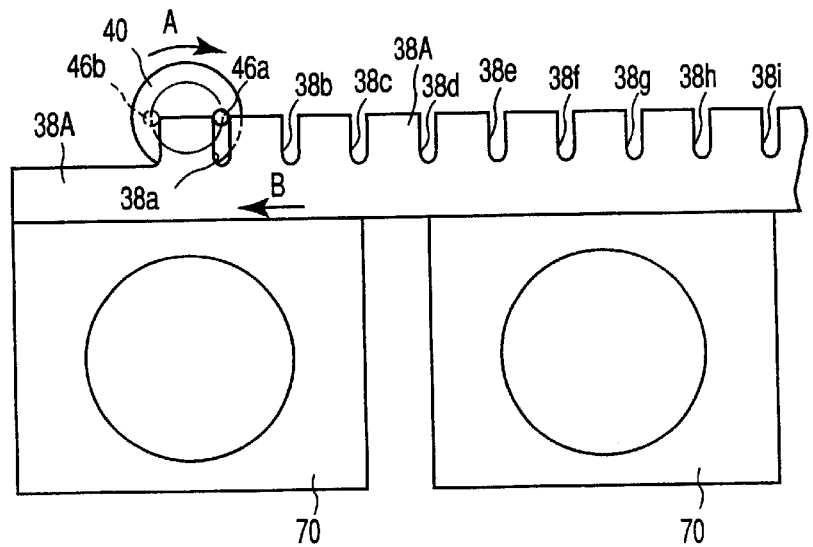
FIG. 26 is a partial plan view of a cube switching apparatus of embodiment 4.

FIG. 26 is a partial plan view showing embodiment 4, i.e., a cube switching apparatus. This embodiment is the first modification of embodiment 2, and the intermittent operation transmission means of the rotary objective lens switching apparatus is applied to a linear cube switching apparatus. Referring to FIG. 26, rotation of a,driving wheel 40 is transmitted by a motor and gear train (neither are shown) using the same mechanism as in embodiment 2. Engaging pins 46a and 46b stand on the upper and lower surfaces of a disk portion of the driving wheel 40. Also, first driven wheel 38A and second driven wheel (not shown) are attached to the upper and lower surfaces of a cube support member (not shown), to which cubes 70 are attached, so as to integrally achieve a linear motion. Engaging grooves 38a to 38i are formed on the first driven wheel 38A at the same pitch as the spacing between engaging pins 46a and 46b. When the engaging pin 46a engages with one of these engaging grooves and the driving wheel 40 rotates in the direction of an arrow A, the cube support member can be moved in the direction of an arrow B. Also, engaging grooves 39a to 39i are formed on the second driven wheel, but the second driven when has no engaging grooves for portions (38a 38f, 38g) where the cube is aligned to an observation optical axis m (portions indicated one-dashed chain lines in FIG. 26). Since other arrangements, operations and effects are the same as those in embodiment 2, a description thereof will be omitted.

Embodiment 5

Figure 27:
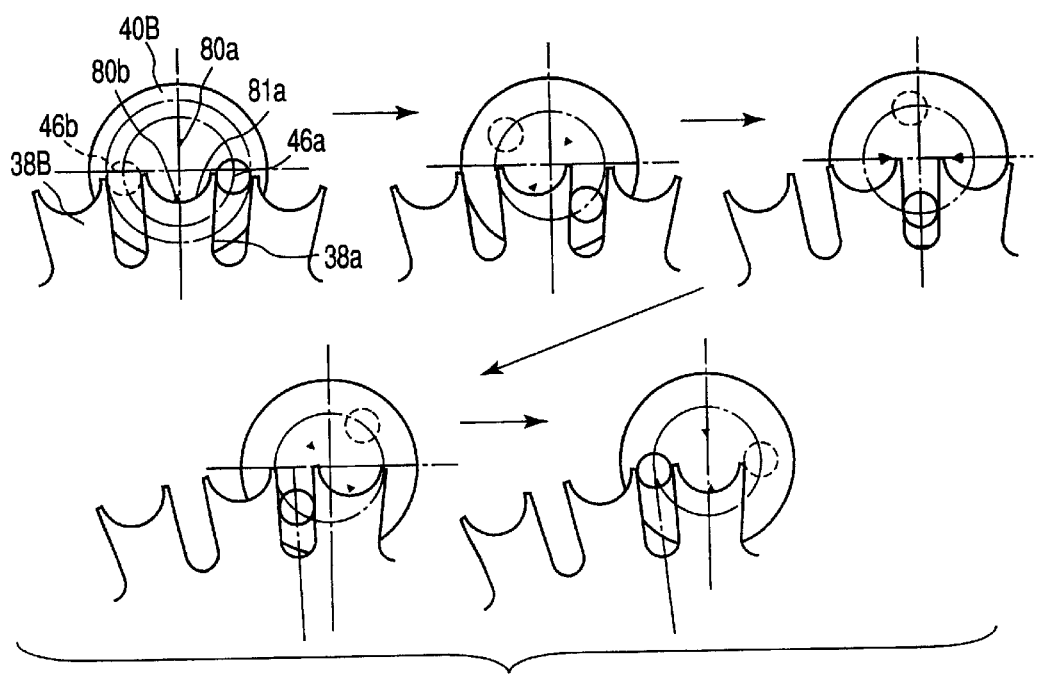
FIG. 27 is a view showing the operation of an intermittent operation transmission means as a part of an objective lens switching apparatus of embodiment 5.

FIG. 27 shows embodiment 5, and the operation of an intermittent operation transmission means as a part of an objective lens switching apparatus. This embodiment is the second modification of embodiment 2, and stationary portions 80a and 80b for a driving wheel 40B and an engaging recessed portion 81a for a driven wheel 38B are formed as a rotation fixing means of the driving wheel 40B and driven wheel 38B as in embodiment 3. Since other arrangements, operations and effects are the same as those in embodiment 3, a description thereof will be omitted. Since this embodiment comprises means for restricting a rotational force when the engaging pin of the driving wheel disengages from the driven wheel, intermittent power transmission can be done more reliably.

As described above, according to the present invention, since the driving force of the motor driving source is converted into an intermittent detection operation of the switching member to which the optical members are attached, each optical member is accurately aligned on the optical path by the alignment means, and the aligned position of the optical member is confirmed by the detection means, the positional relationship can be easily adjusted by simple means, and the optical members can be reliably switched in correspondence with a change in attached state of optical members.

In addition to the above effects, since the engaging pin of the driving wheel engages with the toothed groove of the driven wheel to rotate the driven wheel once, and the driven wheel stands still even during rotation of the driving wheel while the cylindrical portion of the driving wheel engages with the pigeon tail shaped stationary portion of the driven wheel so as to achieve intermittent transmission, the rotation control of the motor driving source can be roughly made.

Furthermore, in addition to the above effects, since rotation of the driving wheel can be alternately and efficiently transmitted to the first and second driven wheels, an index angle corresponding to the number of optical members attached can be easily obtained.

Moreover, in addition to the above effects, since the intermittent operation transmission means can be constructed by a simple mechanism, the optical member switching apparatus can have a simple structure and its cost can be reduced.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical member switching apparatus for electomotively switching a plurality of optical members, comprising:

intermittent operation transmission means for intermittently making power transmission between a motor driving source and a switching member to which the optical members are attached;

alignment means for aligning at least one of the plurality of optical members on an optical path during a pause period of power transmission by said intermittent operation transmission means; and detection means for detecting if at least one of the plurality of optical members is aligned on the optical path by said alignment means, wherein said intermittent operation transmission means further comprises:

a motor gear provided to the motor driving source;

a spur gear which meshes with said motor gear;

a driving wheel which is integrally formed with said spur gear, and has a transmission pause portion for pausing power transmission from the motor driving source, and a power transmission portion for transmitting power from the motor driving source;

a small gear which meshes with a large gear of the switching member; and a driven wheel which is integrally formed with said small gear, and which has a slave transmission pause portion for pausing power transmission from said driving wheel, and a power transmission portion for transmitting power from said driving wheel, wherein a rotation amount of the slave transmission pause portion defined by a gap between the slave transmission pause portion and the transmission pause portion is smaller than a rotation amount of said alignment means in a rotation direction thereof.

2. An optical member switching apparatus according to claim 1, wherein the slave transmission pause portion is a pigeon tail shaped stationary portion formed on an outer periphery of said driven wheel, the slave power transmission portion is a toothed groove having epicycloidally approximated gear teeth, which is formed on the outer periphery of said driven wheel and on a portion other than the pigeon tail shaped stationary portion, the transmission pause portion is a stationary portion which engages with the stationary portion of said driven wheel, and the power transmission portion is an engaging pin which engages with the toothed groove of said driven wheel and the number of which is equal to the number of toothed grooves.

3. An optical member switching apparatus according to claim 2, wherein the number obtained by dividing the number of teeth of the large gear provided in the switching member by the number of teeth of the small gear that engages with the larger gear is the same as the number of optical members attached to the switching member.

4. An optical member switching apparatus according to claim 1, wherein the motor driving source is a DC geared motor.

5. An optical member switching apparatus to be mounted to a microscope, for electomotively switching a plurality of optical members, said optical member switching apparatus comprising:

a mounting member attached to the microscope;

a rotation member rotatably held by the mounting member, to which said plurality of optical members are attached;

a large gear provided on an outer circumferential portion of the rotation member;

a small gear that engages with the large gear;

a driven wheel fixed on a rotation shaft of the small gear and having epicycloidally approximated gear teeth and a pigeon tail shaped portion;

a DC geared motor for switching over said plurality of optical members;

a motor gear provided to the DC geared motor;

a driving wheel fixed to a position where the driving wheel engages with the motor gear, and having an are-shaped stationary portion that engages with the pigeon tail shaped portion of the driven wheel, and an engagement portion that engages with the toothed grooves of the driven wheel;

alignment means for aligning optical members mounted on the rotation member with respect to an optical axis of the microscope; and detection means for detecting a rotation of the rotation member.

6. An optical member switching apparatus according to claim 5, wherein a rotation amount of the switching member defined by a gap between a transmission pause portion of the driving wheel of said optical member switching apparatus and a slave transmission pause portion of the driven wheel is smaller than a rotation amount of the switching member caused by the alignment means.

* * * * *